(12) United States Patent
Akkarakaran et al.

(10) Patent No.: US 11,509,379 B2
(45) Date of Patent: Nov. 22, 2022

(54) TECHNIQUES FOR DYNAMIC SIDELINK WAVEFORM SELECTION

(71) Applicant: QUALCOMM Incorporated, San Diego, CA (US)

(72) Inventors: Sony Akkarakaran, Poway, CA (US); Ling Ding, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/110,971

(22) Filed: Dec. 3, 2020

(65) Prior Publication Data
US 2021/0175954 A1 Jun. 10, 2021

Related U.S. Application Data

(60) Provisional application No. 62/944,759, filed on Dec. 6, 2019.

(51) Int. Cl.
| | |
|---|---|
| H04B 7/06 | (2006.01) |
| H04W 8/24 | (2009.01) |
| H04L 25/02 | (2006.01) |
| H04W 76/27 | (2018.01) |
| H04W 80/02 | (2009.01) |
| H04W 72/04 | (2009.01) |
| H04L 5/00 | (2006.01) |
| H04W 92/18 | (2009.01) |

(52) U.S. Cl.
CPC ......... *H04B 7/0695* (2013.01); *H04B 7/0626* (2013.01); *H04L 5/005* (2013.01); *H04L 25/0226* (2013.01); *H04W 8/24* (2013.01); *H04W 72/046* (2013.01); *H04W 72/0413* (2013.01); *H04W 76/27* (2018.02); *H04W 80/02* (2013.01); *H04W 92/18* (2013.01)

(58) Field of Classification Search
CPC .................................................... H04B 7/0695
See application file for complete search history.

(56) References Cited

U.S. PATENT DOCUMENTS

| 11,375,527 B1* | 6/2022 | Eyuboglu | H04W 72/1273 |
| 2015/0244432 A1* | 8/2015 | Wang | H04B 7/0697 |
| | | | 375/267 |

(Continued)

OTHER PUBLICATIONS

Huawei, et al., "Sidelink CSI", 3GPP Draft, R1-1813553, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 3, 2018 (Nov. 3, 2018), XP051479891, 6 pages, Retrieved from the Internet: URL: http://www.3gpp.org/ftp/tsg%5Fran/WG1%5FRL1/TSGR1%5F95/Docs/R1%2D1813553%2Ezip, [retrieved on Nov. 3, 2018] Sections 1-5, the Whole Document.

(Continued)

*Primary Examiner* — Fahmida S Chowdhury
(74) *Attorney, Agent, or Firm* — Arent Fox, LLP

(57) ABSTRACT

Techniques for dynamic sidelink waveform selection are disclosed. In an example, a user equipment (UE) may determine capabilities of the UE and at least one other UE. The UE may also dynamically select a waveform for sidelink beam training based on the capabilities. The UE may also communicate with the at least one other UE based on the selected waveform.

29 Claims, 8 Drawing Sheets

(56) References Cited

U.S. PATENT DOCUMENTS

| | | | | |
|---|---|---|---|---|
| 2019/0182812 | A1* | 6/2019 | Shimezawa | H04W 72/044 |
| 2019/0356368 | A1* | 11/2019 | Liu | H04L 27/2605 |
| 2019/0364556 | A1* | 11/2019 | Davydov | H04B 7/0695 |
| 2019/0372647 | A1* | 12/2019 | Su | H04W 16/28 |
| 2020/0059915 | A1* | 2/2020 | Lee | H04W 72/0406 |
| 2020/0145867 | A1* | 5/2020 | Tseng | H04W 48/16 |
| 2020/0336253 | A1* | 10/2020 | He | H04W 4/40 |
| 2020/0343951 | A1* | 10/2020 | Hou | H04B 7/088 |
| 2021/0021536 | A1* | 1/2021 | Ganesan | H04W 72/1278 |
| 2021/0056770 | A1* | 2/2021 | Moradi Pari | H04B 7/0626 |
| 2021/0105066 | A1* | 4/2021 | Uchiyama | H04B 7/2606 |
| 2021/0243796 | A1* | 8/2021 | Panteleev | H04W 8/24 |
| 2022/0039009 | A1* | 2/2022 | Iyer | H04W 72/044 |

OTHER PUBLICATIONS

Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages, Retrieved from the Internet: URL: http://www.3gpp.org/ftp/Meetings%5F3GPP%5FSYNC/RAN1/Docs/R1%2D1900862%2Ezip, [retrieved on Jan. 20, 2019], Section 2.3, The Whole Document, p. 1-5.

International Search Report and Written Opinion—PCT/US2020/063249—ISA/EPO—dated Apr. 1, 2021.

"R1-1809619 Rel-15 LTE UE Feature List_rm", 3GPP Draft; R1-1809619, REL-15 LTE UE Feature List_RM, 3rd Generation Partnership Project (3GPP), Mobile Competence Centre; 650, Route Des Lucioles, F-06921 Sophia-Antipolis Cedex, France, Aug. 23, 2018 (Aug. 23, 2018), 21 Pages, XP051516980, Retrieved from the Internet: URL: http://www.3gpp.org/ftp/tsg%5Fran/WG1%5FRL1/TSGR1%5F94/Docs/R1%2D1809619%2Ezip [retrieved on Aug. 23, 2018], pp. 6-7, the Whole Document.

* cited by examiner

TECHNIQUES FOR DYNAMIC SIDELINK WAVEFORM SELECTION

CROSS-REFERENCE TO RELATED APPLICATION(S)

This application claims the benefit of U.S. Provisional Application Ser. No. 62/944,759, entitled "TECHNIQUES FOR DYNAMIC SIDELINK WAVEFORM SELECTION" and filed on Dec. 6, 2019, which is expressly incorporated by reference herein in its entirety.

BACKGROUND

Aspects of the present disclosure relate generally to communication systems, and more particularly, to techniques for dynamic sidelink (SL) waveform selection.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) new radio (NR) technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC). Some aspects of 5G NR technologies may be based on the fourth generation (4G) Long Term Evolution (LTE) standard.

High frequency carriers, such as millimeter-wave (mmW), may be used by 5G NR technologies. High frequency carriers may enable higher data rate communications (e.g., gigabit data rates), as compared to other wireless technologies, due to the availability of large amounts of bandwidth in the higher frequencies. However, mmW communications may present some challenges. For example, mmW communications may suffer from very high attenuation of the transmitted signal as compared with sub-6 GHz signal transmissions. Moreover, mmW signals may be susceptible to blockage (e.g., due to obstacles, such as buildings, foliage, terrain, etc., in the signal path) due to the small wavelength of the signals.

Although beamforming may be performed (e.g., at Tx and/or Rx antennas) in an attempt to mitigate the signal attenuation or to provide directional beams in order to best utilize the channel, the use of beamforming with respect to high frequency carriers (e.g., mmW) in some wireless communication systems (e.g., many cellular communication system configurations) presents its own challenges. For example, the unique challenges of heavy path-loss faced by mmW systems suggests techniques such as analog beamforming. However, the use of several wideband power amplifiers in a system implementing analog beamforming techniques can introduce issues with respect to the communication system signals, such as issues regarding peak-to-average power ratio (PAPR), spectral efficiency, etc. Accordingly, there exists a need for further improvements in 5G NR technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a first user equipment (UE) is provided. The method may include determining capabilities of the first UE and at least one second UE. The method may also include selecting a waveform for sidelink beam training between the first UE and the at least one second UE based on the capabilities. The method may also include communicating with the at least one second UE based on the selected waveform.

In another aspect, a method of wireless communication by a base station is provided. The method may include determining capabilities of a transmitting UE and at least one receiving UE. The method may also include selecting a waveform for sidelink beam training between the transmitting UE and the at least one receiving UE based on the capabilities. The method may also include transmitting, to one or more of the transmitting UE or the at least one receiving UE, an indication of the selected waveform.

In another aspect, a method of wireless communication by a first UE is provided. The method may include determining waveform capabilities of the first UE. The method may also include transmitting, to a base station or a second UE, the waveform capabilities. The method may also include communicating, in response to the transmitted waveform capabilities, with the second UE for sidelink beam training based on a selected waveform.

In one or more other aspects, apparatus and computer-readable mediums which perform the methods described herein are disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
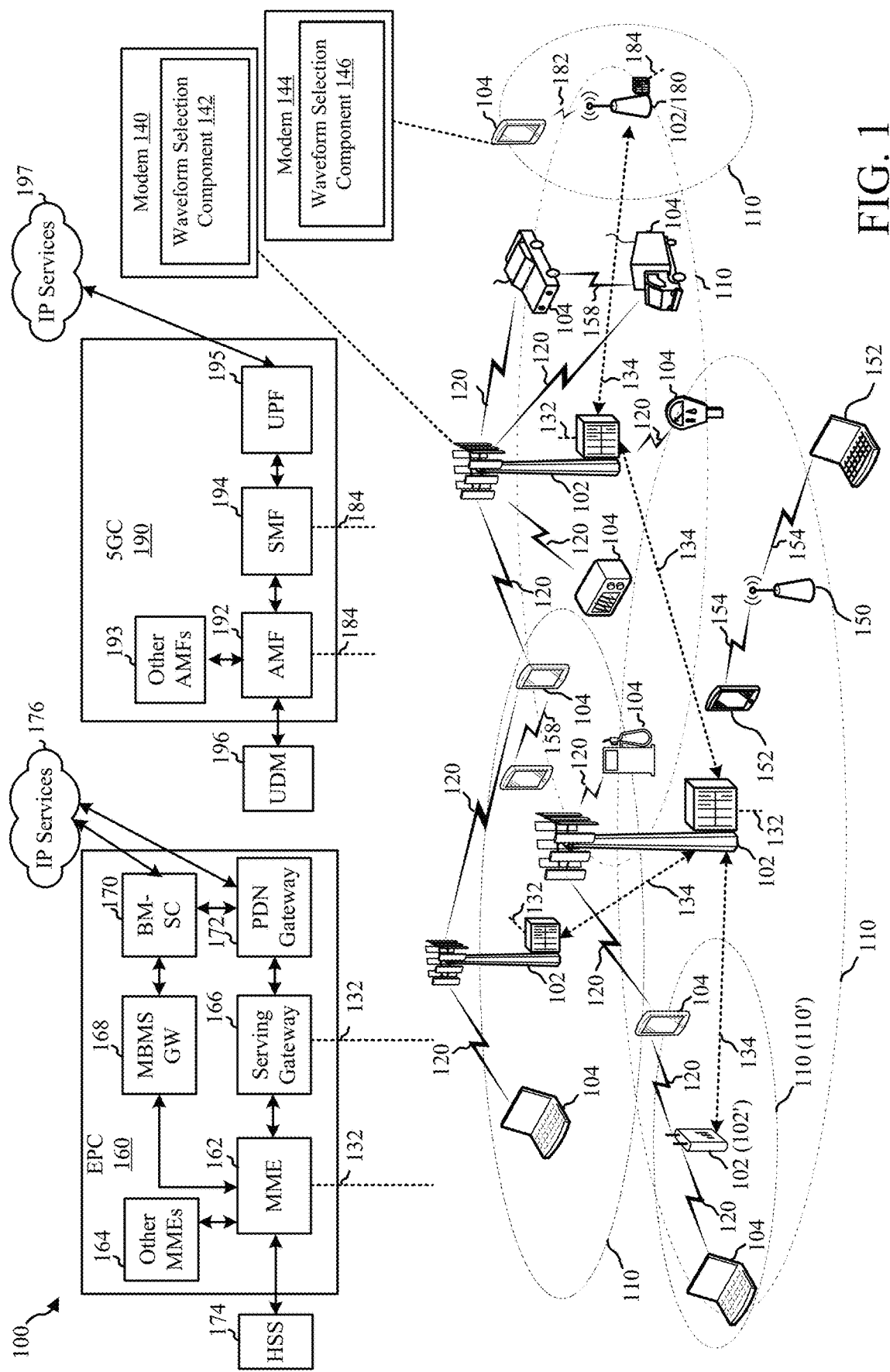
FIG. 1 is a schematic diagram of an example of a wireless communications system and an access network according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

For high frequency carriers, such as millimeter-wave (mmW), beam-training reference signals (RSs) may be needed for communication between devices. Beam-training RSs or waveforms may include either a channel state information RS (CSI-RS) or a sounding RS (SRS). The present disclosure provides techniques for wireless communications devices, including UEs and/or base stations, to select (e.g., dynamically or semi-statically) between these waveforms (CSI-RS or SRS) for sidelink beam training.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a waveform selection component 142 configured to select a waveform for wireless communications. For example, the waveform selection component 142 may determine capabilities of a transmitting UE 104 and at least one receiving UE 104, select a waveform for sidelink (SL) beam training between the transmitting UE and the at least one receiving UE based on the capabilities, and transmit, to one or more of the transmitting UE or the at least one receiving UE, an indication of the selected waveform. The capabilities may include the UE support on beam training waveform (e.g., CSI-RS transmission and receiving and/or SRS transmission and receiving) and the max number of simultaneous radio frequency (RF) chains.

The UE 104 may include a modem 144 having a waveform selection component 146 configured to select a waveform for wireless communications. For example, the waveform selection component 146 may be configured to determine capabilities of the UE 104 and at least one other UE 104, select a waveform for sidelink beam training between the UE 104 and the at least one other UE 104, based on the capabilities, and communicate with the at least one other UE based on the selected waveform.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5GNR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers mayor may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
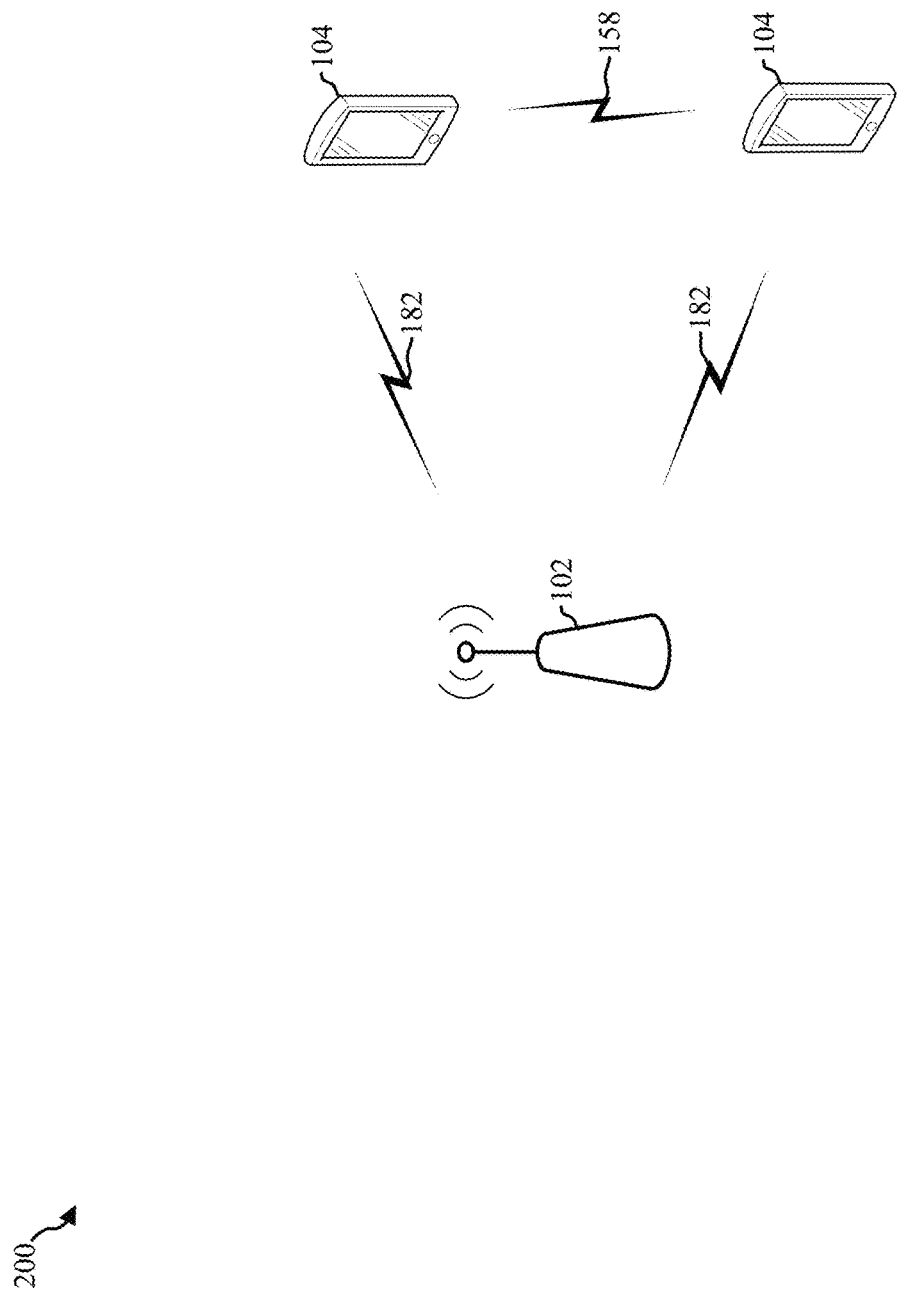
FIG. 2 is a schematic diagram of an example wireless communications system according to aspects of the present disclosure.

Referring to FIG. 2, an example wireless communications system 200 is described. The wireless communication system 200 may be implemented in the wireless communications system and an access network 100 of FIG. 1. As shown, the base station 102 may communicate with UEs 104 via communication links 182, which may be referred herein as Uu interfaces or access links. Further, the UEs 104 may communicate with each other via communication links 158, which may be referred herein as sidelink (SL) interfaces. Accordingly, the UEs may be SL UEs 104 when communicating (or attempting to communicate) with each other.

As previously discussed, SL communications, such as communication link 158, may use a beam-training RS for selecting a beam for communication. The RS may be either CSI-RS or SRS. Each of these signals may provide some advantages and disadvantages, as shown by Table 1.

TABLE 1

| | Example Advantages | Example Disadvantages |
| --- | --- | --- |
| CSI-RS | Flexible resource-pattern via configuration<br>Less overhead, as unused resources may be for data channels<br>If dedicated resources are used for CSI-RS (and other small traffic) for SL case, may multiplex more UEs than SRS<br>Maximum number of ports greater than SRS (e.g., 32*) | High power consumption<br>High PAPR |

TABLE 1-continued

| | Example Advantages | Example Disadvantages |
| --- | --- | --- |
| SRS | Low PAPR | Not as flexible as CSI-RS: fixed range of OFDM symbols<br>High overhead (compared to CSI-RS)<br>Maximum number of ports less than CSI-RS (e.g., 4*) |

*these example numbers are based on UE to base station interface (e.g., Uu interface). SL interface may have different number of ports.

In an aspect, waveform selection may be based on the advantages and disadvantages shown by Table 1. For example, consideration of SRS having a lower PAPR than CSI-RS causing a low-PAPR waveform to be favorable especially when close to the power headroom (PH) limit (based on a PH report). In another example, a maximum number of RF chains available for beam training may be considered. In this example, beam-sweeping may be performed over several RF chains (e.g., to reduce the beam-training latency). In yet another example, UE 104 capabilities may be considered. In this example, capabilities for both transmitting and receiving UEs 104 may be considered. If a Uu interface is used, UE 104 capabilities and base station 102 capabilities may be considered, however, a UE 104 may not need to be explicitly aware of base station 102 capabilities as the base station 102 may control link configurations.

In an aspect, waveform selection may be based on a one to many beam training. For example, assuming UE 104 capabilities allow both SRS reception and transmission and CSI-RS reception and transmission, a low PAPR waveform (e.g., SRS) may be a better choice than a high PAPR waveform (e.g., CSI-RS), if resource usage is not a concern. In another example, capabilities of a transmitting UE 104 and all receiving UEs 104 may be considered. In this example, there may be more than one receiving UE 104 for groupcast/multicast purposes. Even if there is only one primary receiving UE 104 for communication purposes, there may be other UEs 104 monitoring the signal for interference measurement purposes. If the groupcast group changes dynamically, and contains UEs 104 with a mix of different capabilities, this may require dynamic change of waveform.

In an aspect, waveform capabilities may be indicated to a base station 102 or a SL UE 104 for SL beam-training. For example, capabilities for reception and transmission of CSI-RS and SRS may be used. In an example, an SRS may be generated based on a particular sequence (e.g., Zadoff-Chu sequence) or a low-PAPR-SRS (e.g., pi/2-BPSK modulated sequences), especially for the case where data is transmitted via pi/2-BPSK. In an example, capabilities may be implicitly tied to Uu link capabilities (e.g., those capabilities related to cross link interference measurements), or capabilities for low-PAPR RS for other applications, such as pi/2-BPSK SRS for positioning. The indications of the waveform capabilities may be sent to the base station 102 or the SL UE 104. For example, an indication of waveform capabilities may be sent from a UE 104 to the base station 102 via one or more signals such as a radio resource control (RRC) signal, a medium access control-control element (MAC-CE) signal, or a uplink control information (UCI) signal. In another example, an indication of waveform capabilities may be sent from a first SL UE 104 to a second SL UE 104 via one or more SL signals such as a master information block (MIB)

signal, a system information block (SIB) signal, an RRC signal, an MAC-CE signal, or a sidelink control information (SCI) signal.

In an aspect, a SL beam-training waveform may be indicated as part of configuration and/or via some form of triggering. In an example, an indication of the waveform may be implicit based on a first UE 104 capabilities. For example, if a first SL UE 104 reports capabilities that indicate support for only one RS (e.g., CSI-RS) to a second SL 104 or base station 102, then no indication of which waveform is needed because the second SL 104 or base station will select a waveform based on the capabilities of the first SL UE 104. In another example, an indication of the waveform may depend on a groupcast size and dynamics (e.g., ability to support mixed-capability group) of the groupcast. For example, an indication of a selected waveform may be sent from a UE 104 to the base station 102 via one or more signals such as an RRC signal, an MAC-CE signal, or an UCI signal. In another example, an indication of the selected waveform may be sent from a first SL UE 104 to a second SL UE 104 via one or more SL signals such as an MIB signal, an SIB signal, an RRC signal, an MAC-CE signal, or an SCI signal. In another example, an indication of the selected waveform may be sent from a base station 102 to a UE 104 via one or more signals such as an MIB signal, an SIB signal, an RRC signal, an MAC-CE signal, or a downlink control information (DCI) signal.

In some examples, a PH report may be based on a time-duration consisting of only SL transmissions, only Uu transmissions, or both SL and Uu transmissions. In some examples, SL beam-training waveform may be related to data transmission waveform (e.g., SRS used with discrete Fourier transform spread (DFT-s) OFDM and CSI-RS used with OFDM).

As discussed herein, beam training is based on the selection of the waveform (e.g., CSI-RS or SRS). In an NR system, when the beam training (or data communications) is between the base station 102 and the UE 104, this is called a Uu interface. In this example, CSI-RS may be used for DL and SRS may be used for UL. If the UL beam corresponds to the DL beam then the beam used for CSI-RS for DL may also be used for UL beam training due to the beam correspondence. However, if the UL beam does not correspond to the DL beam, the SRS used for UL and the CSI-RS used for DL do not in general share any relationship between their beams. In other words, there may be no correlation between presence/absence of beam-correspondence and usage of same vs different waveforms on the UL and DL link directions. Thus, waveform choice is, in general, mainly driven by PAPR and transmission/reception capability considerations, and a beam can be set independently of the waveform choice.

In an NR system, when the beam training (or data communications) is between two UEs 104, this is called a SL interface. In this example, a transmitting UE 104 corresponds to a receiving UE 104, and vice versa, and both the transmitting UE 104 and the receiving UE 104 want to know what transmission beam or reception beam will be used for the beam training procedure.

In an aspect, the UE 104 capabilities may include CSI-RS for reception (which may be a default setting), CSI-RS for transmission (e.g., if agreed by SL), SRS for reception (in some UE), and SRS for transmission (which may be a default setting).

In another aspect, the number of RF chains may be used for UE 104 capabilities. However, the number of RF chains may not play a role in waveform selection, but may need to verify that a sufficient number of RF chains are available for simultaneous RF chains to perform CSI-RS and/or SRS based beam training.

In another aspect, some of the factors for waveform selection include CSI-RS and SRS, a PH report, and a one to many case. For example, the SRS may have a lower PAPR than the CSI-RS which may cause selection of a waveform. In another example, a PH report may dynamically change the waveform, and the PH report may trigger a waveform switch. For example, a low PH may trigger a switch to a low PAPR waveform (e.g., SRS). In another example, when there is a one-to-many case (e.g., one transmitting UE 104 to many receiving UEs 104) the waveform may dynamically change when a UE 104 comes and goes.

Figure 3:
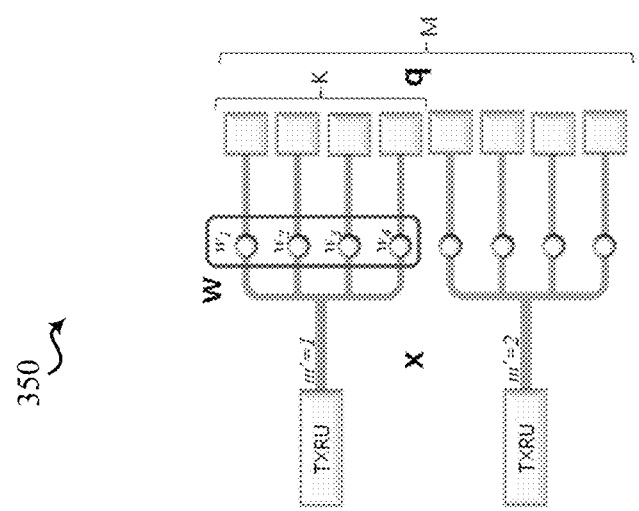
FIG. 3 is a schematic diagram of an example of analog beam forming according to aspects of the present disclosure.
Figure 3:
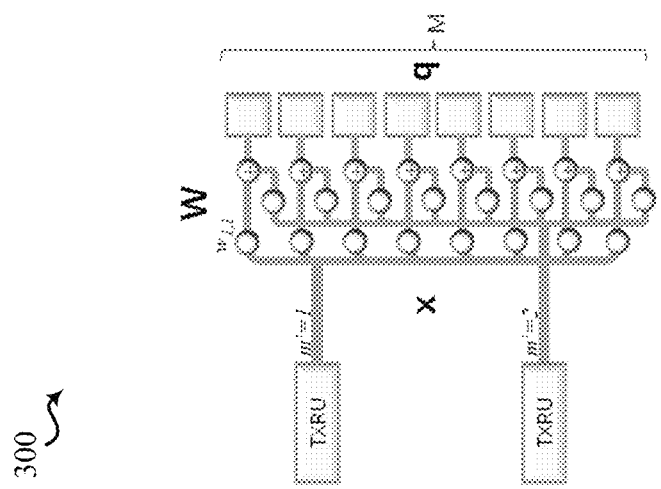

In an aspect, PAPR may be considered for waveform selection. In analog beamforming, different connection models may mean different PAPRs. For example, referring to FIG. 3, a full connection model 300 may have a larger PAPR than a subarray partition model 350, wherein txru is a transmit/receive unit, m' is an index of a digital port (e.g., models 300 and 350 shows two digital ports), W is a weight vector, w is an individual weight in the vector, x refers to an input, and q refers to a grouping of 'subarrays' (e.g., in model 300, all antenna elements form one big subarray because each element is connected to both the digital ports m' via separate weights w; in model 350, there are two smaller subarrays each of four antenna elements, each subarray is connected to one digital port m'. For transmit direction, since the peak-to-average (PA) sees the sum of the two separate signals in the former case, the PAPR may be higher). In digital beam forming, if a precoding matrix is not an identity-matrix, multi-beam for single user (SU)/multi-user (MU)-MIMO may increase PAPR. In another example, in-use RF chain(s) may be in the same or different panels as each other, and different panels may have different PAPRs. The features of the analog beamforming, digital beamforming, and RF chains may apply to both CSI-RS and SRS.

In an aspect, if CSI-RS is used, in FDM with data channel (e.g., under Uu interface), a data channel may only be OFDM, and in TDM with data channel (e.g., under SL interface), a data channel has freedom to be either OFDM or DFT-s-OFDM. If SRS is used, in TDM (e.g., under Uu interface), a data channel has freedom to be either OFDM or DFT-s-OFDM.

Figure 4:
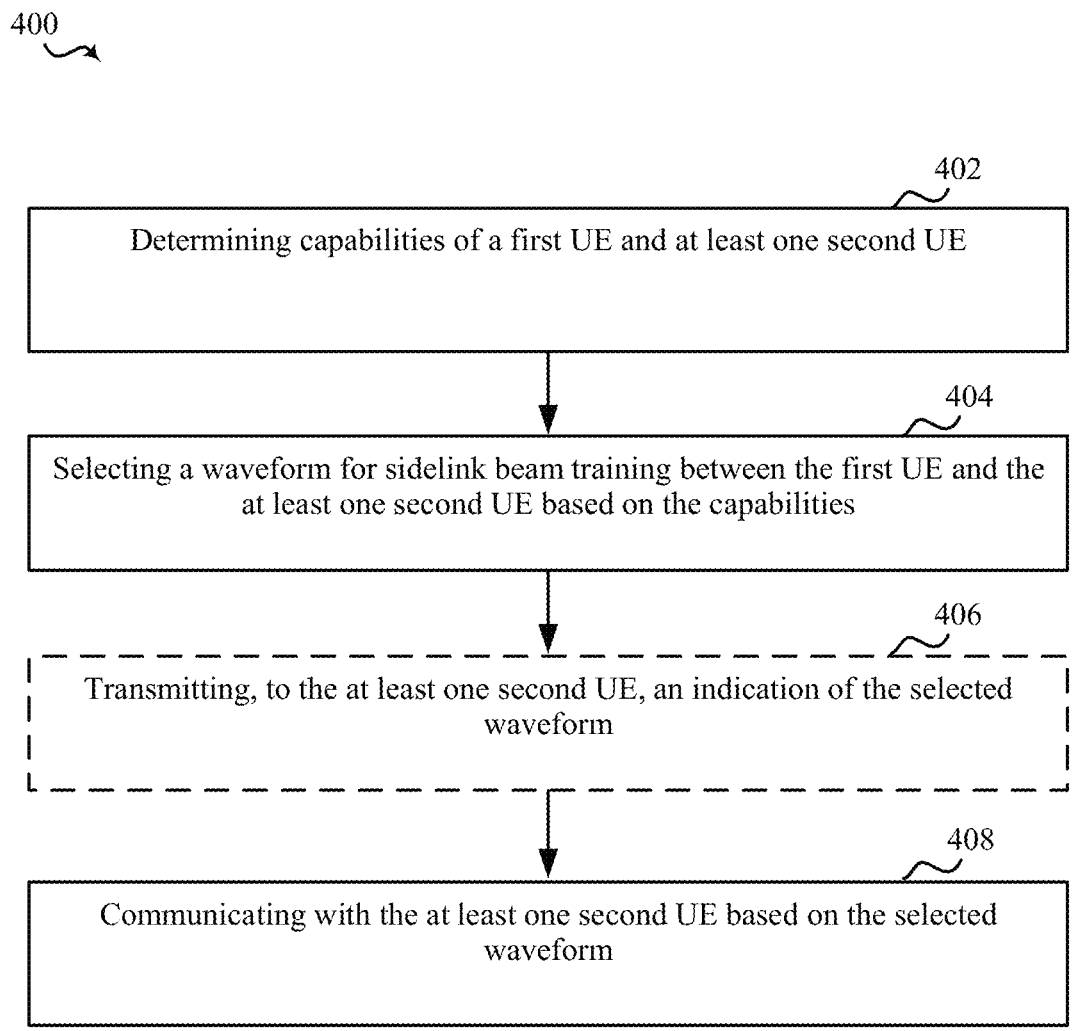
FIG. 4 is a flowchart of an example method of wireless communications by a UE, according to aspects of the present disclosure.

Referring to FIG. 4, an example of a method 400 of wireless communication is disclosed. The method 400 may be performed by the UE 104 of FIG. 1 along with any of the components (see e.g., FIG. 6) of the UE 104. For example, the method 400 may be performed by one or more of a processor 612, a transceiver 602, the modem 144, or the waveform selection component 146.

At 402, the method 400 may include determining capabilities of a first UE and at least one second UE. For example, one or more of the processor 612, the modem 144, or the waveform selection component 146 of the UE 104 may be configured to determine capabilities of the UE 104 and at least one second UE 104. Thus, the processor 612, the modem 144, the waveform selection component 146, and/or one more components/subcomponents of the UE 104 may define the means for determining capabilities of the UE 104 and at least one second UE 104. In an example, the UE 104 may determine capabilities based on capabilities of a groupcast group or access link capabilities (e.g., the pi/2-BPSK SRS on Uu interface). In another example, the UE 104 may receive, from the at least one sidelink UE 104, an indication of capabilities of the at least one sidelink UE. In an example, the indication may be received via one or more of an MIB, an SIB, an RRC, a MAC-CE, or a DCI. In an example, the capabilities of the first UE 104 or the at least one second UE 104 may include support by the first UE 104 or the at least one second UE 104 of CSI-RS transmission, CSI-RS receiving, SRS transmission, or SRS receiving. In an example, the capabilities of the first UE 104 or the at least one second UE 104 may include a maximum number of simultaneous radio frequency chains supported by the first UE 104 or the at least one second UE 104.

At 404, the method 400 may include selecting a waveform for sidelink beam training between the UE 104 and the at least one second UE 104 based on the capabilities. For example, one or more of the processor 612, the modem 144, or the waveform selection component 146 of the UE 104 may be configured to select a waveform for sidelink beam training based on the capabilities. Thus, the processor 612, the modem 144, the waveform selection component 146, or one or more components/subcomponents of the UE 104 may define the means for selecting a waveform for sidelink beam training based on the capabilities. In an example, the waveform is one or more of a CSI-RS or a SRS. In an example, the method 400 may select the waveform further based on a power headroom of the UE 104. In an example, the selection of the waveform may be dynamic or semi-static.

At 406, the method 400 may optionally include transmitting, to the at least one second UE, an indication of the selected waveform. For example, one or more of the processor 612, the transceiver 602, the modem 144, or the waveform selection component 146 of the UE 104 may be configured to transmit, to the at least one second UE 104, an indication of the selected waveform. Thus, the processor 612, the transceiver 602, the modem 144, the waveform selection component 146, or one of more components/subcomponents of the UE 104 may define the means for transmitting, to the at least one second UE 104, an indication of the selected waveform.

At 408, the method 400 may include communicating with the at least one second UE based on the selected waveform. For example, one or more of the processor 612, the transceiver 602, the modem 144, or the waveform selection component 146 of the UE 104 may be configured to communicate with the at least one second UE 104 based on the selected waveform. Thus, the processor 612, the transceiver 602, the modem 144, the waveform selection component 146, or one or more components/subcomponents UE 104 may define the means for communicating with the at least one second UE 104 based on the selected waveform.

Figure 5:
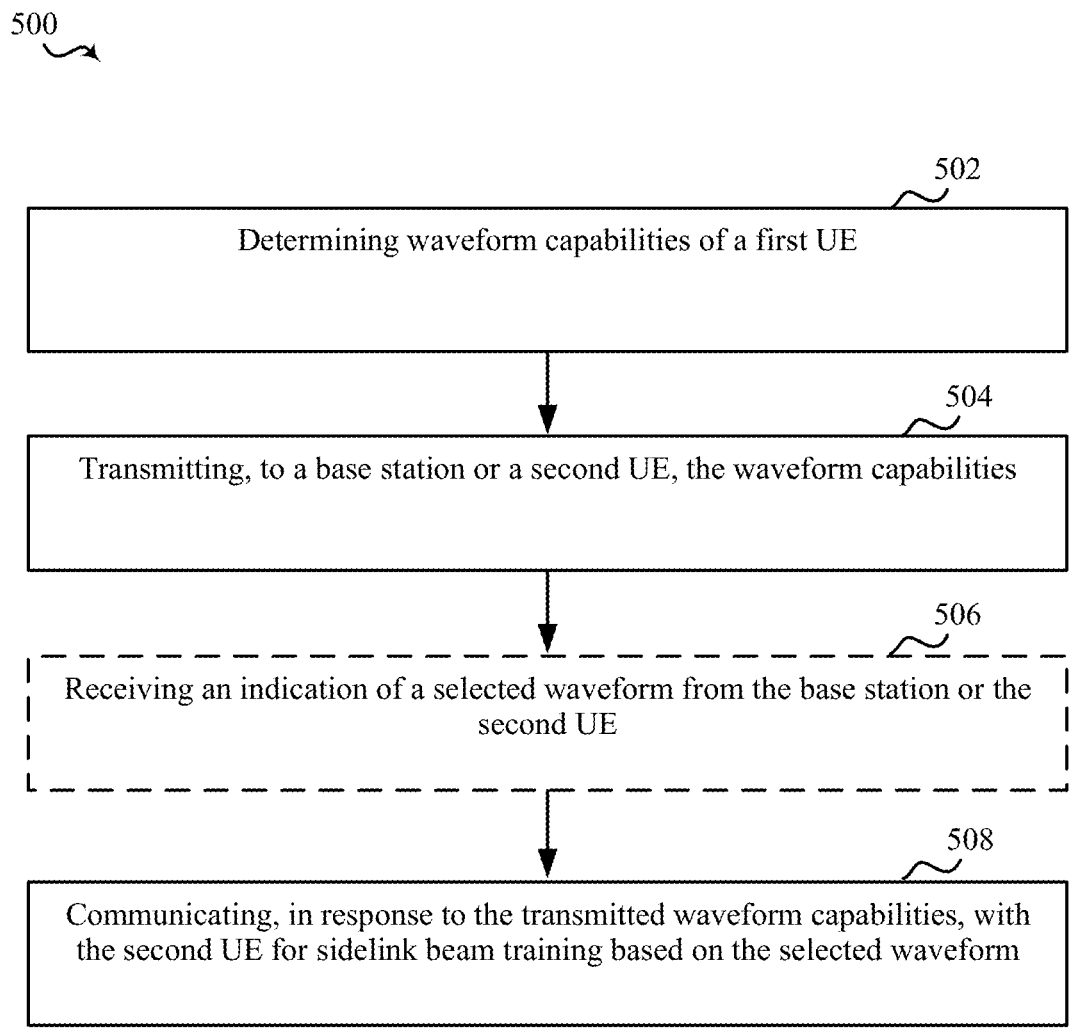
FIG. 5 is a flowchart of another example method of wireless communications by a UE, according to aspects of the present disclosure.

Referring to FIG. 5, an example method 500 of wireless communication is disclosed. The method 500 may be performed by the UE 104 of FIG. 1 along with any of the components (see e.g., FIG. 6) of the UE 104. For example, the method 500 may be performed by one or more of a processor 612, a transceiver 602, the modem 144, or the waveform selection component 146.

At 502, the method 500 may include determining waveform capabilities of a first UE. For example, one or more of the processor 612, the modem 144, or the waveform selection component 146 of the UE 104 may be configured to determine waveform capabilities of the UE 104. Thus, the processor 612, the modem 144, the waveform selection component 146, or one or more components/subcomponents of the UE 104 may define the means for determining waveform capabilities of the UE 104. In an example, the UE 104 may determine waveform capabilities based on capabilities of a groupcast group or access link capabilities (e.g., Uu interface). In an example, the capabilities may be based on support by the UE 104 of CSI-RS transmission, CSI-RS receiving, SRS transmission, or SRS receiving. In an example, the capabilities may be based on a maximum number of simultaneous RF chains supported by the UE 104.

At 504, the method 500 may include transmitting, to a base station or a second UE, the waveform capabilities. For example, one or more of the processor 612, the transceiver 602, the modem 144, or the waveform selection component 146 of the UE 104 may be configured to transmitting, to a base station 102 or a second UE 104, the waveform capabilities. Thus, the processor 612, the transceiver 602, the modem 144, the waveform selection component 146, or one or more components/subcomponents of the UE 104 may define the means for transmitting, to a base station 102 or a second UE 104, the waveform capabilities. In an example, the UE 104 may transmit the waveform capabilities via an indication. The indication may be transmitted via one or more of an MIB, an SIB, an RRC, a MAC-CE, or a DCI.

At 506, the method 500 may optionally include receiving an indication of a selected waveform from the base station or the second UE. For example, one or more of the processor 612, the transceiver 602, the modem 144, or the waveform selection component 146 of the UE 104 may be configured to receive an indication of a selected waveform from the base station 102 or the second UE 104. Thus, the processor 612, the transceiver 602, the modem 144, the waveform selection component 146, or one of more components/subcomponents of the UE 104 may define the means for receiving an indication of a selected waveform from the base station 102 or the second UE 104.

At 508, the method 500 may include communicating, in response to the transmitted waveform capabilities, with the second UE for sidelink beam training based on a selected waveform. For example, one or more of the processor 612, the transceiver 602, the modem 144, or the waveform selection component 146 of the UE 104 may be configured to communicate, in response to the transmitted waveform capabilities, with the second UE 104 for sidelink beam training based on a selected waveform. Thus, the processor 612, the transceiver 602, the modem 144, the waveform selection component 146, or one or more components/subcomponents of the UE 104 may define the means for communicating, in response to the transmitted waveform capabilities, with the second UE 104 for sidelink beam training based on a selected waveform.

Figure 6:
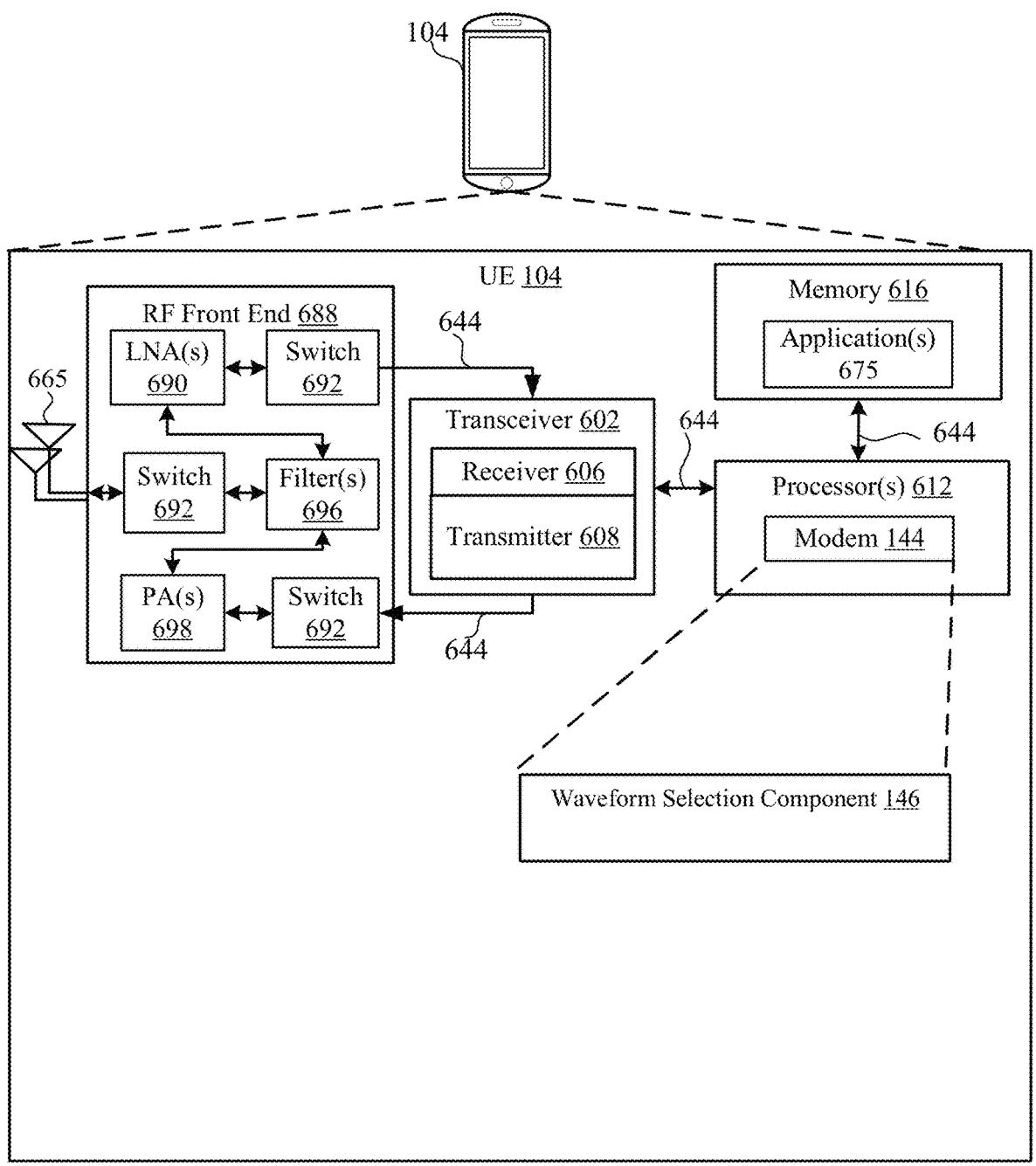
FIG. 6 is a schematic diagram of an example of the UE of FIG. 1, according to aspects of the present disclosure.

Referring to FIG. 6, one example of an implementation of the UE 104 may include a variety of components, some of which have already been described above, but including components such as one or more processors 612, memory 616, and transceiver 602 in communication via one or more buses 344, which may operate in conjunction with a modem 144 to enable one or more of the functions of the methods 400 or 500 described herein. The one or more processors 612, modem 140, memory 616, the transceiver 602, RF front end 688 and one or more antennas 665, may be configured to support voice and/or data calls (simultaneously or non-simultaneously) in one or more radio access technologies.

In an aspect, the one or more processors 612 may include the modem 144 that uses one or more modem processors. The various functions related to the waveform selection component 146 may be included in the modem 144 and/or the processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with the transceiver 602. In other aspects, some of the features of the one or more processors 612 and/or the modem 144 may be performed by the transceiver 602.

Also, the memory 616 may be configured to store data used herein and/or local versions of applications 675 or the waveform selection component 146 and/or one or more of its subcomponents being executed by the at least one processors 612. The memory 616 may include any type of computer-readable medium usable by a computer or the at least one processor 612, such as random access memory (RAM), read only memory (ROM), tapes, magnetic discs, optical discs, volatile memory, non-volatile memory, and any combination thereof. In an aspect, for example, the memory 616 may be a non-transitory computer-readable storage medium that stores one or more computer-executable codes defining the waveform selection component 146 and/or one or more of its subcomponents, and/or data associated therewith, when the UE 104 is operating the at least one processor 612 to execute the waveform selection component 146 and/or one or more of its subcomponents.

The transceiver 602 may include at least one receiver 606 and at least one transmitter 608. The receiver 606 may include hardware, firmware, and/or software code executable by a processor for receiving data, the code comprising instructions and being stored in a memory (e.g., computer-readable medium). The receiver 606 may be, for example, a radio frequency (RF) receiver. In an aspect, the receiver 606 may receive signals transmitted by at least one of the base stations 102. Additionally, the receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may include, but is not limited to, an RF transmitter. The transceiver 602, receiver 606, and/or transmitter 608 may be configured to operate in mmW frequencies and/or near mmW frequencies.

Moreover, in an aspect, the UE 104 may include the RF front end 688, which may operate in communication with one or more antennas 665 and the transceiver 602 for receiving and transmitting radio transmissions, for example, wireless communications transmitted by at least one of the base stations 102 or wireless transmissions transmitted by the UE 104. The RF front end 688 may be connected to the one or more antennas 665 and may include one or more low-noise amplifiers (LNAs) 690, one or more switches 692, one or more power amplifiers (PAs) 698, and one or more filters 696 for transmitting and receiving RF signals.

In an aspect, the LNA 690 may amplify a received signal at a desired output level. In an aspect, each of the LNAs 690 may have a specified minimum and maximum gain values. In an aspect, the RF front end 688 may use the one or more switches 692 to select a particular LNA 690 and its specified gain value based on a desired gain value for a particular application.

The one or more PA(s) 698 may be used by the RF front end 688 to amplify a signal for an RF output at a desired output power level. In an aspect, each of the PAs 698 may have specified minimum and maximum gain values. In an aspect, the RF front end 688 may use the one or more switches 692 to select a particular PA 698 and its specified gain value based on a desired gain value for a particular application.

Also, for example, the one or more filters 696 may be used by the RF front end 688 to filter a received signal to obtain an input RF signal. Similarly, in an aspect, for example, a respective filter 696 may be used to filter an output from a respective PA 698 to produce an output signal for transmission. In an aspect, each of the filters 696 may be connected to a specific LNA 690 and/or PA 398. In an aspect, the RF front end 688 may use the one or more switches 692 to select a transmit or receive path using a specified filter 696, LNA 690, and/or PA 698, based on a configuration as specified by the transceiver 602 and/or the processor 612.

As such, the transceiver 602 may be configured to transmit and receive wireless signals through the one or more antennas 665 via the RF front end 688. In an aspect, the transceiver 602 may be tuned to operate at specified frequencies such that the UE 104 may communicate with, for example, one or more of the base stations 102 or one or more cells associated with one or more of the base stations 102. In an aspect, for example, the modem 144 may configure the transceiver 602 to operate at a specified frequency and power level based on the UE configuration of the UE 104 and the communication protocol used by the modem 144.

In an aspect, the modem 144 may be a multiband-multimode modem, which may process digital data and communicate with the transceiver 602 such that the digital data is sent and received using the transceiver 602. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 688, transceiver 602) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 7:
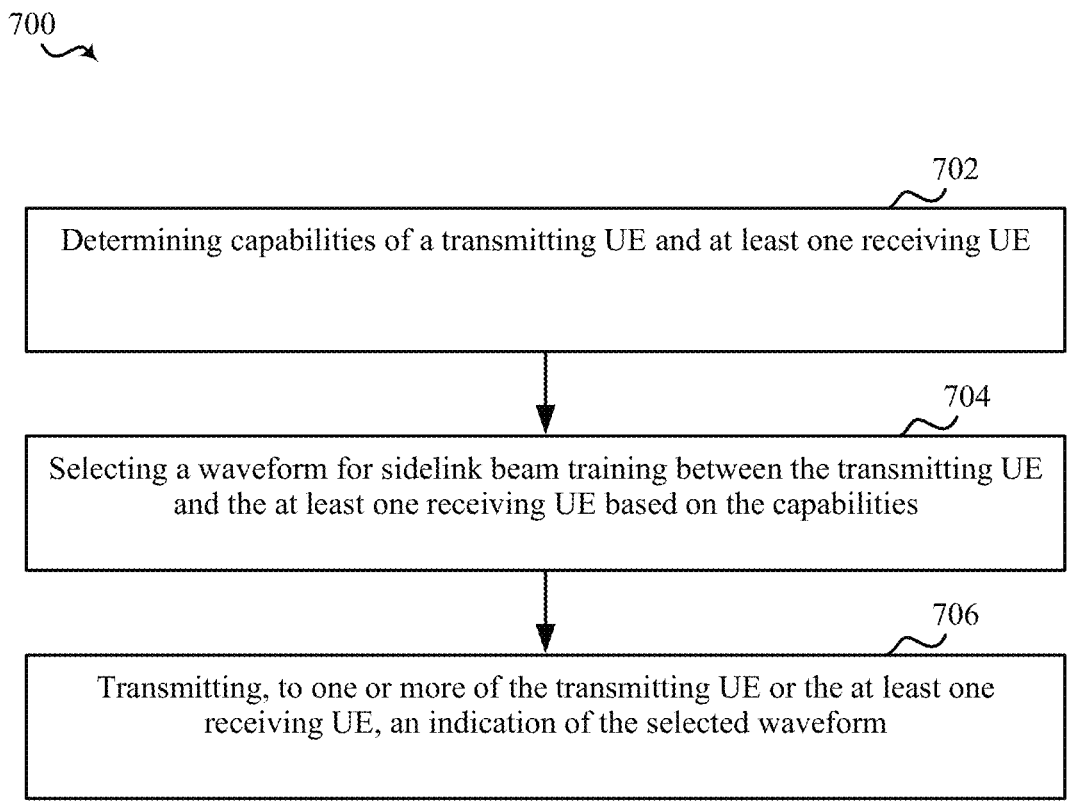
FIG. 7 is a flowchart of an example method of wireless communications by a base station, according to aspects of the present disclosure.

Referring to FIG. 7, an example of a method 700 of wireless communications is disclosed. The method 700 may be performed by the base station 102 of FIG. 1 along with any of the components (see e.g., FIG. 8) of the base station 102. For example, the method 700 may be performed by one or more of the a processor 812, a transceiver 802, the modem 140, or the waveform selection component 142.

At 702, the method 700 may include determining capabilities of a transmitting UE and at least one receiving UE. For example, one or more of the processor 812, the transceiver 802, the modem 140, or the waveform selection component 142 may be configured to determine capabilities of a transmitting UE 104 and at least one receiving UE 104. Thus, the processor 812, the transceiver 802, the modem 140, the waveform selection component 142, or one or more components/subcomponents may define the means for determining capabilities of a UE 104 and at least one receiving UE 104. In an example, the UE 104 may determine capabilities based on capabilities of a groupcast group or access link capabilities (e.g., Uu interface). In another example, the UE 104 may receive, from the at least one receiving UE 104, an indication of capabilities of the at least one sidelink UE. In an example, the indication may be received via one or more of an MIB, an SIB, an RRC, a MAC-CE, or a DCI.

In an example, the capabilities of the transmitting UE or the at least one receiving UE may include support by the transmitting UE or the at least one receiving UE of CSI-RS transmission, CSI-RS receiving, SRS transmission, or SRS receiving. In an example, the capabilities of the transmitting UE or the at least one receiving UE may include a maximum number of simultaneous radio frequency chains supported by the transmitting UE or the at least one receiving UE.

At 704, the method 700 may include selecting a waveform for sidelink beam training between the transmitting UE and the at least one receiving UE based on the capabilities. For example, one or more of the processor 812, the modem 140, or the waveform selection component 142 may selecting a waveform for sidelink beam training based on the capabilities. Thus, the processor 812, the modem 140, the waveform selection component 142, or one or more components/subcomponents may define the means for selecting a waveform for sidelink beam training based on the capabilities. In an example, the waveform is one or more of a CSI-RS or a SRS. In an example, the selection of the waveform may be dynamic or semi-static.

At 706, the method 700 may also include transmitting, to one or more of the transmitting UE or the at least one receiving UE, an indication of the selected waveform. For example, one or more of the processor 812, the transceiver 802, the modem 140, or the waveform selection component 142 may be configured to transmit, to one or more of the transmitting UE 104 or the at least one receiving UE 104, an indication of the selected waveform. Thus, the processor 812, the transceiver 802, the modem 140, the waveform selection component 142, or one of its subcomponents may define the means for transmitting, to one or more of the transmitting UE 104 or the at least one receiving UE 104, an indication of the selected waveform.

Figure 8:
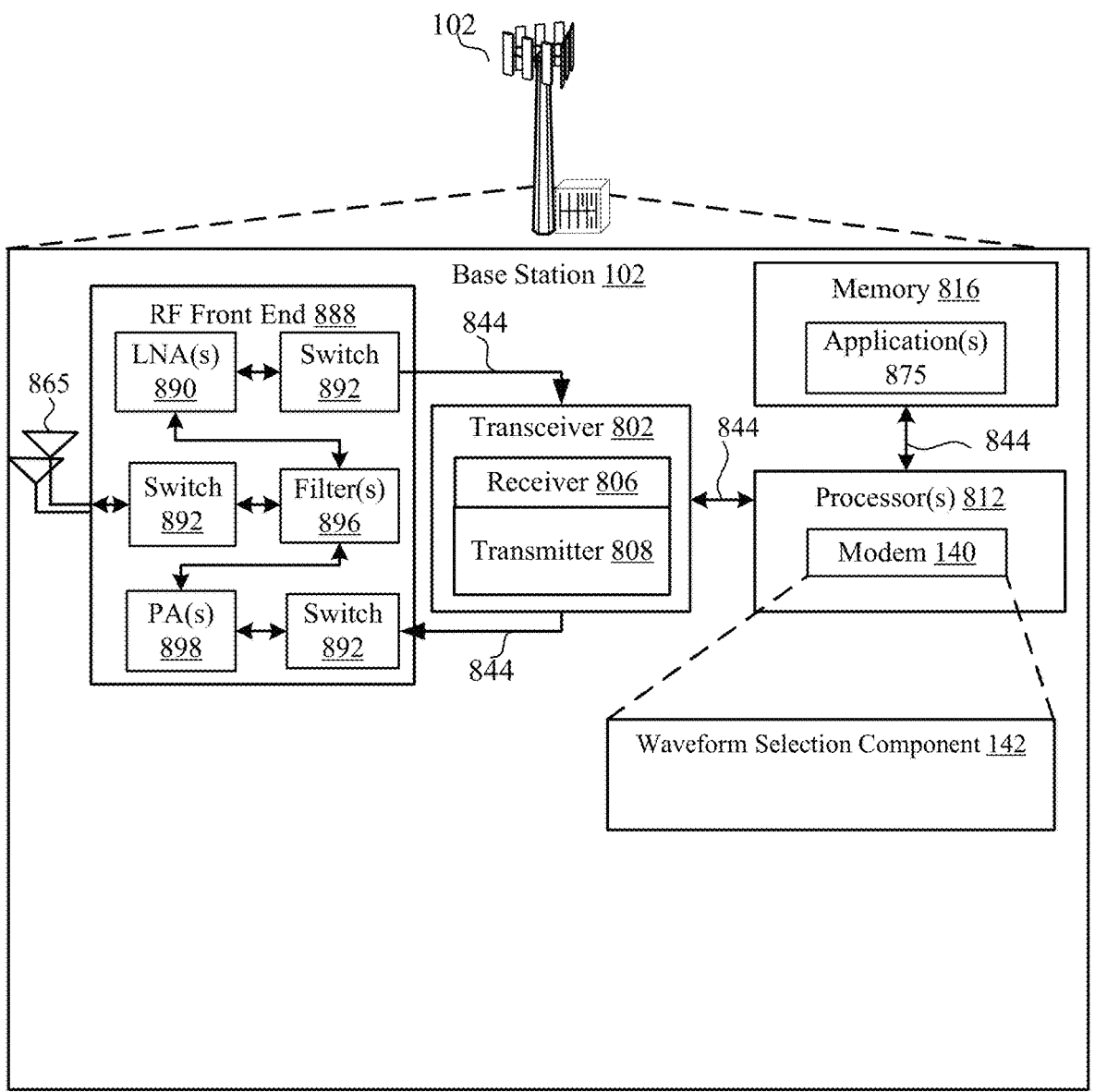
FIG. 8 is a schematic diagram of an example of the base station of FIG. 1, according to aspects of the present disclosure.

Referring to FIG. 8, one example of an implementation of base station 102 may include a variety of components, some of which have already been described above, but including components such as one or more processors 812, memory 816 and transceiver 802 in communication via one or more buses 844, which may operate in conjunction with modem 140 and the waveform selection component 142 to enable one or more of the functions of the method 700 described herein.

The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of the UE 104, as described above, but configured or otherwise programmed for base station operations as opposed to UE operations.

Some Further Example Aspects

An example method of wireless communication by a first UE, comprising: determining capabilities of the first UE and at least one second UE; selecting a waveform for sidelink beam training between the first UE and the at least one second UE based on the capabilities; and communicating with the at least one second UE based on the selected waveform.

The above example method, wherein the waveform is one or more of a CSI-RS or SRS.

One or more of the above example methods, wherein the determining the capabilities of the first UE and the at least one second UE includes determining support by the first UE or the at least one second UE of CSI-RS transmission, CSI-RS receiving, SRS transmission, or SRS receiving.

One or more of the above example methods, wherein the determining the capabilities of the first UE and the at least one second UE includes determining a maximum number of simultaneous radio frequency chains supported by the first UE or the at least one second UE.

One or more of the above example methods, wherein the determining the capabilities comprises determining capabilities of a groupcast group.

One or more of the above example methods, wherein the determining the capabilities comprises determining access link capabilities.

One or more of the above example methods, wherein the determining the capabilities comprises receiving, from the at least one second UE, an indication of capabilities of the at least one second UE.

One or more of the above example methods, wherein the indication is received via one or more of an MIB signal, an SIB signal, an RRC signal, an MAC-CE signal, or a DCI signal.

One or more of the above example methods, wherein the indication of capabilities of the at least one second UE is received either directly from the at least one second UE or indirectly from the at least one second UE via a node (e.g., base station or relay UE).

One or more of the above example methods, further comprising: transmitting, to the at least one second UE, an indication of the selected waveform.

One or more of the above example methods, wherein the indication is transmitted via one or more of an MIB signal, an SIB signal, an RRC signal, an MAC-CE signal, or a DCI signal.

One or more of the above example methods, wherein the indication of the selected waveform is transmitted either directly to the at least one second UE or indirectly to the at least one second UE via a node (e.g., base station or relay UE).

One or more of the above example methods, wherein selecting the waveform is further based on a power headroom of the first UE.

One or more of the above example methods, wherein selecting the waveform is dynamic or semi-static.

An example second method of wireless communication by a base station, comprising: determining capabilities of a transmitting UE and at least one receiving UE; selecting a waveform for sidelink beam training between the transmitting UE and the at least one receiving UE based on the capabilities; and transmitting, to one or more of the transmitting UE or the at least one receiving UE, an indication of the selected waveform.

The above example second method, wherein the waveform is one or more of a CSI-RS or SRS.

One or more of the above example second methods, wherein the determining the capabilities of the transmitting UE and the at least one receiving UE includes determining support by the transmitting UE or the at least one receiving UE of CSI-RS transmission, CSI-RS receiving, SRS transmission, or SRS receiving.

One or more of the above example second methods, wherein the determining the capabilities of the transmitting UE and the at least one receiving UE includes determining a maximum number of simultaneous radio frequency chains supported by the transmitting UE or the at least one receiving UE.

One or more of the above example second methods, wherein the determining the capabilities comprises determining capabilities of a groupcast group.

One or more of the above example second methods, wherein the determining the capabilities comprises determining access link capabilities.

One or more of the above example second methods, wherein the determining the capabilities comprises receiving, from one or more of the transmitting UE or the at least one receiving UE, an indication of capabilities.

One or more of the above example second methods, wherein the indication of the capabilities is received via one or more of an RRC signal, or an MAC-CE signal.

One or more of the above example second methods, wherein the indication of the selected waveform is transmitted via one or more of an MIB signal, an SIB signal, an RRC signal, an MAC-CE signal, or a DCI signal.

One or more of the above example second methods, wherein selecting the waveform is further based on a power headroom of the transmitting UE.

An example third method of wireless communication by a first UE, comprising: determining waveform capabilities of the first UE; transmitting, to a base station or a second UE, the waveform capabilities; and communicating, in response to the transmitted waveform capabilities, with the second UE for sidelink beam training based on a selected waveform.

The above example third method, wherein the determining the waveform capabilities of the first UE includes determining support by the first UE of CSI-RS transmission, CSI-RS receiving, SRS transmission, or SRS receiving.

One or more of the above example third methods, wherein the determining the waveform capabilities of the first UE includes determining a maximum number of simultaneous radio frequency chains supported by the first UE.

One or more of the above example third methods, further comprising: receiving an indication of the selected waveform from the base station or the second UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication by a first user equipment (UE), comprising:
   determining capabilities of the first UE and at least one second UE;
   selecting a waveform for sidelink beam training between the first UE and the at least one second UE based on the capabilities; and
   communicating with the at least one second UE based on the selected waveform.

2. The method of claim 1, wherein the waveform is one or more of a channel state information reference signal (CSI-RS) or a sounding reference signal (SRS).

3. The method of claim 1, wherein the determining the capabilities of the first UE and the at least one second UE includes determining support by the first UE or the at least one second UE of a channel state information reference signal (CSI-RS) transmission, a CSI-RS receiving, a sounding reference signal (SRS) transmission, or an SRS receiving.

4. The method of claim 1, wherein the determining the capabilities of the first UE and the at least one second UE includes determining a maximum number of simultaneous radio frequency chains supported by the first UE or the at least one second UE.

5. The method of claim 1, wherein the determining the capabilities comprises determining capabilities of a groupcast group.

6. The method of claim 1, wherein the determining the capabilities comprises determining access link capabilities.

7. The method of claim 1, wherein the determining the capabilities comprises receiving, from the at least one second UE, an indication of capabilities of the at least one second UE.

8. The method of claim 7, wherein the indication is received via one or more of a master information block (MIB) signal, a system information block (SIB) signal, a radio resource control (RRC) signal, a medium access control-control element (MAC-CE) signal, or a sidelink control information (SCI) signal.

9. The method of claim 7, wherein the indication of capabilities of the at least one second UE is received either directly from the at least one second UE or indirectly from the at least one second UE via a node.

10. The method of claim 1, further comprising:
    transmitting, to the at least one second UE, an indication of the selected waveform.

11. The method of claim 10, wherein the indication is transmitted via one or more of a master information block (MIB) signal, a system information block (SIB) signal, a radio resource control (RRC) signal, a medium access control-control element (MAC-CE) signal, or a sidelink control information (SCI) signal.

12. The method of claim 11, wherein the indication of the selected waveform is transmitted either directly to the at least one second UE or indirectly to the at least one second UE via a node.

13. The method of claim 1, wherein selecting the waveform is further based on a power headroom of the first UE.

14. The method of claim 1, wherein selecting the waveform includes dynamically or semi-statically selecting the waveform.

15. A method of wireless communication by a base station, comprising:
    determining capabilities of a transmitting user equipment (UE) and at least one receiving UE;
    selecting a waveform for sidelink beam training between the transmitting UE and the at least one receiving UE based on the capabilities; and
    transmitting, to one or more of the transmitting UE or the at least one receiving UE, an indication of the selected waveform.

16. The method of claim 15, wherein the waveform is one or more of a channel state information reference signal (CSI-RS) or a sounding reference signal (SRS).

17. The method of claim 15, wherein the determining the capabilities of the transmitting UE and the at least one receiving UE includes determining support by the transmitting UE or the at least one receiving UE of channel state information reference signal (CSI-RS) transmission, a CSI-RS receiving, a sounding reference signal (SRS) transmission, or an SRS receiving.

18. The method of claim 15, wherein the determining the capabilities of the transmitting UE and the at least one receiving UE includes determining a maximum number of simultaneous radio frequency chains supported by the transmitting UE or the at least one receiving UE.

19. The method of claim 15, wherein the determining the capabilities comprises determining capabilities of a groupcast group.

20. The method of claim 15, wherein the determining the capabilities comprises determining access link capabilities.

21. The method of claim 15, wherein the determining the capabilities comprises receiving, from one or more of the transmitting UE or the at least one receiving UE, an indication of capabilities.

22. The method of claim 21, wherein the indication of the capabilities is received via one or more of a radio resource control (RRC) signal, a medium access control-control element (MAC-CE) signal, or an uplink control information (UCI) signal.

23. The method of claim 15, wherein the indication of the selected waveform is transmitted via one or more of a master information block (MIB) signal, a system information block (SIB) signal, a radio resource control (RRC) signal, a medium access control-control element (MAC-CE) signal, or a downlink control information (DCI) signal.

24. The method of claim 15, wherein selecting the waveform is further based on a power headroom of the transmitting UE.

25. The method of claim 15, wherein selecting the waveform includes dynamically or semi-statically selecting the waveform.

26. A method of wireless communication by a first user equipment (UE), comprising:
    determining waveform capabilities of the first UE;
    transmitting, to a base station or a second UE, the waveform capabilities; and
    communicating, in response to the transmitted waveform capabilities, with the second UE for sidelink beam training based on a selected waveform.

27. The method of claim 26, wherein the determining the waveform capabilities of the first UE includes determining support by the first UE of a channel state information reference signal (CSI-RS) transmission, a CSI-RS receiving, a sounding reference signal (SRS) transmission, or an SRS receiving.

28. The method of claim 26, wherein the determining the waveform capabilities of the first UE includes determining a maximum number of simultaneous radio frequency chains supported by the first UE.

29. The method of claim 26, further comprising:
receiving an indication of the selected waveform from the base station or the second UE.

\* \* \* \* \*